J. Woolman,
Door Bolt
Nº 19,891.   Patented Apr. 6, 1858.

UNITED STATES PATENT OFFICE.

JNO. WOOLMAN, OF PHILADELPHIA, PENNSYLVANIA.

DOOR-BOLT.

Specification of Letters Patent No. 19,891, dated April 6, 1858.

*To all whom it may concern:*

Be it known that I, JOHN WOOLMAN, of the city of Philadelphia, State of Pennsylvania, have invented a new and Improved Eccentric Bolt for Fastening Doors, Shutters, Gates, &c.; and I do hereby declare that the following is a full and exact description thereof, reference being had to the annexed drawings, making a part of this specification, and the figures and letters of reference marked thereon.

The nature of my invention consists in the use of a flat or elliptical bolt, confined in a casing or straps of such shape and construction, as to allow the said bolt after being entered to its required place for fastening in the catch or socket, to be moved with an eccentric motion, by means of a handle or lever, from its position when so entered, (with its flat side or conjugate diameter of the ellipse about parallel to the surface of the door shutter &c. to which it is attached, to any required angle with said surface, so as to draw firmly together the respective surfaces to which the said bolt, and the socket for receiving it are attached, and holding them in that position.

To enable others skilled in the art to make and use my invention, I will proceed to describe it as illustrated.

Figure 1:
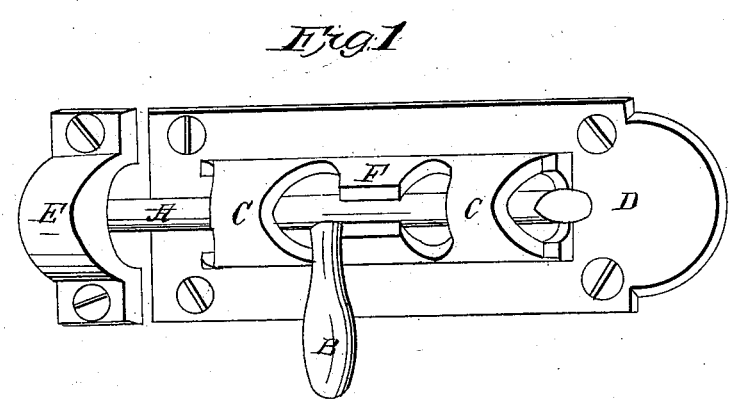
Figure 2:
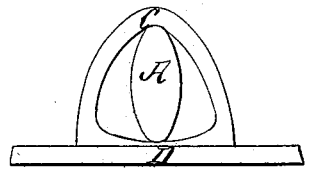
Figure 3:
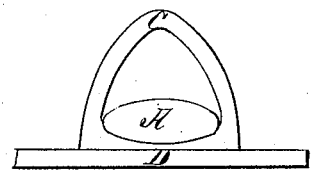

Figure 1,—a perspective view showing the position of the bolt when in the socket, and the flat side, or conjugate diameter, about at right angles with the surface, having been so placed by moving the handle or lever in the required direction. Fig. 2,—end view, showing the position of the bolt when the fastening is complete, and the surfaces to which it is applied drawn tightly together. Fig. 3,—end view, showing the position of the bolt when lying about parallel to the surface to which it is attached.

Letter A, the flat or elliptical bolt to which an eccentric motion is given by the handle B, by turning it within the straps or casings C, C. Letter B,—the handle or lever by which said bolt A, is operated or moved. Letter C,—the casing or straps of a regularly or irregularly curved triangular form, or any other suitable form for causing the eccentric motion of the bolt A, when turned within them. Letter D,—the plate to which the casing, or straps, & guard, are attached. Letter E,—the socket which receives the bolt, made with the inside surface flat, and so formed as to have said flat surface to correspond with the flat or elliptical surface of the bolt A, when entered; but in opposition, or about at right angles with it, when by the use of the handle or lever B, said bolt is tightened, or placed at about right angles to the surface on which it is placed. Letter F,—the guard, provided with a slot for the movement of the handle or lever B.

The operation of the bolt as here illustrated is as follows,—viz:—The bolt A, when free, lies loosely in its place, at any angle with the surface to which it is applied. When it is to be used to fasten,—the handle B is operated or moved to pass through the slot in the guard F, and change the position of the bolt A, during which the head of the bolt enters the socket E,—said handle B, having passed through the said slot in the guard F, is then placed in a position to give said bolt the required angle to tighten it, and draw the parts to which it and the socket is applied, closely together.

It is generally known among carpenters, that doors, shutters, &c, are apt to warp or twist, and the bolts commonly used become very inconvenient and difficult to operate under such circumstances. This bolt has been found to obviate such trouble, moving freely to its place when the flat side of the bolt, when flat, or conjugate diameter of the elliptical shaped bolt, is parallel to the surface; and capable of becoming as firm and tight as any other bolt by changing its position relatively to the surface to which it is applied, which is done by moving the handle toward such surface. When so operated, it is also capable, when the parts are properly proportioned, of drawing tightly the two bearings of the doors, shutters, &c. to which it is applied; even should they be separated by a warp or twist, half an inch or more. In its use there is no inconvenience experienced from the bending or tightness of the bolt. It must always move freely, as it lies very loosely within its straps or casings. Even ice will not be likely to seriously interfere with it, as it can be freed in ordinary cases by simply moving the handle.

I am aware that a bolt is a common device for securing doors, shutters, &c.

I am also aware that flat bolts are used for such purpose.

I am also aware that there are several patents relating to door-bolts now in existence, by which devices of different kinds are secured. But

What I claim as my invention and wish to secure by Letters Patent is—

The arrangement of the flat or elliptical bolt A, contained and moving within suitable straps or casings, with an eccentric motion, when operated and moved by means of the handle or lever B, substantially as described.

JOHN WOOLMAN.

Witnesses:
 JONATHAN EGGLETON,
 JOHN CLOUDS.